US010296528B2

(12) United States Patent
Lu

(10) Patent No.: US 10,296,528 B2
(45) Date of Patent: May 21, 2019

(54) SYSTEMS, METHODS AND SOFTWARE FOR EVALUATING USER QUERIES

(75) Inventor: Qiang Lu, Pittsford, NY (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 785 days.

(21) Appl. No.: 12/347,945

(22) Filed: Dec. 31, 2008

(65) Prior Publication Data

US 2009/0198679 A1     Aug. 6, 2009

Related U.S. Application Data

(60) Provisional application No. 61/009,684, filed on Dec. 31, 2007, provisional application No. 61/009,601, filed on Dec. 31, 2007.

(51) Int. Cl.
*G06F 16/00* (2019.01)
*G06F 16/33* (2019.01)

(52) U.S. Cl.
CPC .................................. *G06F 16/334* (2019.01)

(58) Field of Classification Search
CPC ..................... G06F 17/30395; G06F 17/30666
See application file for complete search history.

(56) References Cited

U.S. PATENT DOCUMENTS

| 6,564,210 B1 * | 5/2003 | Korda | G06F 17/30 |
| 6,678,694 B1 * | 1/2004 | Zimmermann | G06F 17/30705 707/731 |
| 2002/0133726 A1 * | 9/2002 | Kawamae | G06F 17/30867 713/300 |
| 2004/0059565 A1 * | 3/2004 | Dehlinger | G06F 17/30705 704/5 |
| 2004/0236725 A1 * | 11/2004 | Amitay et al. | 707/3 |
| 2005/0086046 A1 * | 4/2005 | Bennett | 704/2 |
| 2005/0108200 A1 * | 5/2005 | Meik | G06F 17/3071 |
| 2006/0167857 A1 * | 7/2006 | Kraft | G06F 17/30528 |
| 2007/0022101 A1 * | 1/2007 | Smith et al. | 707/3 |

(Continued)

OTHER PUBLICATIONS

Ruihua Song; Identifying Ambiguous Queries in Web Search; 2007;pp. 1169 & 1170.*

(Continued)

*Primary Examiner* — Mariela Reyes
*Assistant Examiner* — Jermaine A Mincey
(74) *Attorney, Agent, or Firm* — Duncan Galloway Egan Greenwald, PLLC; Kevin T. Duncan

(57) ABSTRACT

The present inventor devised, among other things, an information retrieval system that determines whether a query is ambiguous or not and based on this determination either continues or aborts a search process. One query evaluation extracts word pairs from an input query and uses features of the extracted word pairs, for example the number of word pairs and their frequencies within a document collection, to determine if the query is ambiguous or not. Another evaluation measures topical convergence, using query related caselaw headnotes that are associated with topics in a legal taxonomy. And yet another checks topical convergence through the lens of full caselaw documents and secondary legal documents, such as law review articles, specifically the minimum number of case law and secondary legal documents that are necessary to span a set of top ranked topics identified using the query.

20 Claims, 2 Drawing Sheets

(56) References Cited

U.S. PATENT DOCUMENTS

| | | | |
|---|---|---|---|
| 2007/0050393 A1* | 3/2007 | Vogel et al. | 707/102 |
| 2007/0136251 A1* | 6/2007 | Colledge et al. | 707/3 |
| 2007/0192293 A1* | 8/2007 | Swen | 707/3 |
| 2007/0226198 A1* | 9/2007 | Kapur | 707/3 |
| 2007/0233656 A1* | 10/2007 | Bunescu | G06F 17/278 |
| 2007/0255686 A1* | 11/2007 | Kemp | G06F 17/30728 |
| 2007/0260601 A1* | 11/2007 | Thompson et al. | 707/5 |
| 2007/0276854 A1* | 11/2007 | Gold | 707/101 |
| 2007/0288439 A1* | 12/2007 | Rappaport et al. | 707/3 |
| 2007/0288457 A1* | 12/2007 | Aravamudan et al. | 707/5 |
| 2007/0299826 A1* | 12/2007 | Wang et al. | 707/3 |
| 2008/0059187 A1* | 3/2008 | Roitblat et al. | 704/257 |
| 2008/0294624 A1* | 11/2008 | Kanigsberg | G06F 17/30867 |

OTHER PUBLICATIONS

Ruihua Song; Identifying Ambiguous Queries in Web Search; May 8-12, 2007; WWW; 1169-1170.*

"International Application Serial No. PCT/US2008/014133, International Search Report dated Mar. 26, 2009", 6 pgs.

"International Application Serial No. PCT/US2008/014133, Written Opinion dated Mar. 26, 2009", 5 pgs.

Cronent, T. S, et al., "Quantifying Query Ambiguity", *Proceedings of the second international conference on human lansuage technology research*, (2002).

Heinz, D., et al., "Assisted Query Formulations Using Normalized word vector and dynamic ontological filtering", *Flexible query answering systems lecture notes in computer science ,lecture notes in artificial intelligence*, vol. 4027, (Jan. 1, 2006), 282-294.

Kim, Y W, "Typology of ambigutyon representation of information problem ,an exploratory study", *proceedings of the american society for information science and technology vol. 40*, 366-380.

Sanderson, M., "Retriving with good science", *Information Retrieval vol. 2*, No. 1, (Feb. 2002).

Vogel, D., et al., "Classifiying Search engine queries using the Web as background language", vol. 7 No. 2, ACM SIGKDD Exploration Newsletter, (2005), 177-122.

* cited by examiner

SYSTEMS, METHODS AND SOFTWARE FOR EVALUATING USER QUERIES

RELATED APPLICATIONS

This application claims priority to U.S. Provisional Application 61/009,684, and also to U.S. Provisional Application 61/009,601, both of which were filed on Dec. 31, 2007 and are incorporated herein by reference.

This application is related to U.S. Provisional Application 60/723,322 filed on Oct. 4, 2005 and U.S. application Ser. No. 11/538,749 filed on Oct. 4, 2006. Both the '322 and the '749 applications are also incorporated herein by reference.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright 2007. Thomson Reuters Global Resources.

TECHNICAL FIELD

Various embodiments of the present invention concern information retrieval systems, particularly online systems that evaluate or screen user queries based on efficacy.

BACKGROUND

The American legal system, as well as some other legal systems around the world, relies heavily on written judicial opinions, the written pronouncements of judges, to articulate or interpret the laws governing resolution of disputes. Each judicial opinion is not only important to resolving a particular legal dispute, but also to resolving similar disputes, or cases, in the future. Because of this, judges and lawyers within our legal system are continually researching an ever-expanding body of past opinions, or case law, for the ones most relevant to resolution of disputes. Moreover, judges and lawyers are also regularly researching an expanding body of federal, state, and city-level statutes that articulate specific laws as well as scholarly law review articles that expand on finer legal or philosophical nuances regarding particular legal issues.

To facilitate these searches Thomson Reuters/West, a division of Thomson Reuters, collects judicial opinions from courts across the United States, and makes them available electronically through its Westlaw™ legal research system. Users access the judicial opinions, for example, by submitting keyword or natural language queries for execution against a jurisdictional database of judicial opinions or case law. The Westlaw system also provides access to legal statutes and secondary legal content, such as legal encyclopedia articles and other scholarly material, that are relevant to specific queries.

A typical user search begins with the user entering and submitting a query: a short sequence of words that ideally defines a specific topic of interest to the user. If the query is well formulated or unambiguous, the system returns a set of ranked legal documents that includes the information the user desires within its higher ranks. On the other hand, if the query is ambiguous, the system is vulnerable to returning a set of documents that are not convergent on the specific information needs of the user. Indeed, within the legal domain, the returned documents may span several unrelated areas of the law and thus leave the user with a significant task of manually sifting through many irrelevant results.

Although it is known to alert or warn a user that a given query may yield search results having a large number of documents, for example more than a 1000, there is no indication in this warning that the query itself is ambiguous in terms of the diversity of topics that the search results may cover. Moreover, if the query is indeed ambiguous, the search itself is likely to be an inefficient use of both computing resources and professional labor.

Accordingly, the present inventor recognized a need for better ways of handling the problem of ambiguous queries.

SUMMARY

To address this and/or other needs, the present inventor devised, among other things, an information retrieval system that determines whether a query is ambiguous or not and based on this determination either continues or aborts a search process. In the exemplary system, the query evaluation takes at least one of three possible forms. The first form extracts word pairs from an input query and uses features of the extracted word pairs, for example the number of word pairs and their frequencies within a document collection, to determine if the query is ambiguous or not. The second form, which measures topical convergence, uses the query to search a database of caselaw headnotes that are associated with topics in a legal taxonomy. The number of topics implicated by the headnote search is used in combination with one or more of the word pair features to determine if the query is ambiguous or not. The third form also checks topical convergence through the lens of caselaw and secondary legal documents, such as law review articles, specifically the minimum number of case law and secondary legal documents that are necessary to span a set of top ranked topics identified using the query.

Although the exemplary embodiment uses all three forms of ambiguity checks, some embodiments may use only one or two of the ambiguity checks. Also, in some embodiments, an ambiguity check that indicates a query is ambiguous results in the user being prompted for further information to clarify the query.

DETAILED DESCRIPTION OF EXEMPLARY EMBODIMENTS

This description, which references and incorporates the above-identified Figures and the appended claims, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Information-Retrieval System

Figure 1:
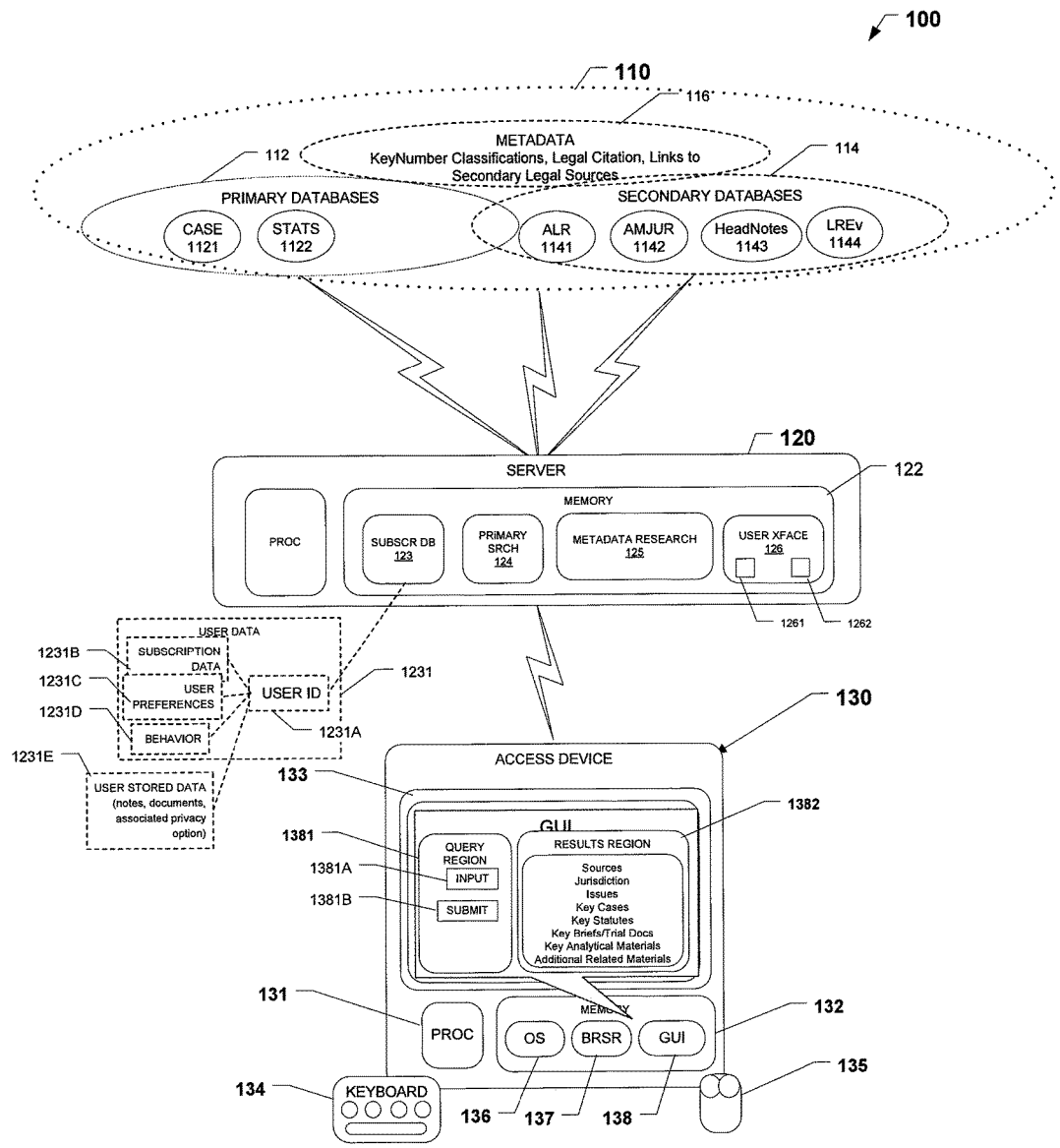
FIG. 1 is a block diagram of an exemplary online legal research system which corresponds to one or more embodiments of the present invention.

FIG. 1 shows an exemplary online information-retrieval (or legal research) system 100. System 100 includes one or more databases 110, one or more servers 120, and one or more access devices 130.

Databases 110 includes a set of primary databases 112, a set of secondary databases 114, and a set of metadata databases 116. Primary databases 112, in the exemplary embodiment, include a caselaw database 1121 and a statutes databases 1122, which respectively include judicial opinions and statutes from one or more local, state, federal, and/or international jurisdictions. Secondary databases 114, which contain legal documents of secondary legal authority or more generally authorities subordinate to those offered by judicial or legislative authority in the primary database, includes an ALR (American Law Reports) database, 1141, an AMJUR database 1142, a West Key Number (KNUM) Classification database 1143, and a law review (LREV) database 1144, as well as other databases that may be mentioned below. Metadata databases 116 includes case law and statutory citation relationships, KeyCite data (depth of treatment data, quotation data, headnote assignment data, and ResultsPlus secondary source recommendation data. Also, in some embodiments, primary and secondary connote the order of presentation of search results and not necessarily the authority or credibility of the search results.

Databases 110, which take the exemplary form of one or more electronic, magnetic, or optical data-storage devices, include or are otherwise associated with respective indices (not shown). Each of the indices includes terms and phrases in association with corresponding document addresses, identifiers, and other conventional information. Databases 110 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a subscriber database 123, a primary search module 124, query discriminator module 125, and a user-interface module 126.

Processor module 121 includes one or more local or distributed processors, controllers, or virtual machines. In the exemplary embodiment, processor module 121 assumes any convenient or desirable form.

Memory module 122, which takes the exemplary form of one or more electronic, magnetic, or optical data-storage devices, stores subscriber database 123, primary search module 124, query discriminator (or evaluation) module 125, and user-interface module 126.

Subscriber database 123 includes subscriber-related data for controlling, administering, and managing pay-as-you-go or subscription-based access of databases 110. In the exemplary embodiment, subscriber database 123 includes one or more preference data structures.

Primary search module 124 includes one or more search engines and related user-interface components, for receiving and processing user queries against one or more of databases 110. In the exemplary embodiment, one or more search engines associated with search module 124 provide Boolean, tf-idf, natural-language search capabilities. Additionally, module 124 includes search capabilities described in co-pending application Ser. No. 11/538,749 which is referenced above as well as Results Plus search capabilities described in co-pending U.S. patent application Ser. No. 11/028,476 which was filed on Jan. 3, 2005 and which is incorporated herein by reference.

Query discriminator module 125 includes machine-executable instructions and related machine-readable data, such as computed features for evaluating the efficacy or ambiguity of queries as further described below. In the exemplary embodiment, module 125 includes one or more feature vector builders and learning machines to implement the functionality described herein.

User-interface module 126 includes machine readable and/or executable instruction sets for wholly or partly defining web-based user interfaces, such as search interface 1261 and results interface 1262, over a wireless or wireline communications network on one or more accesses devices, such as access device 130.

Access device 130 is generally representative of one or more access devices. In the exemplary embodiment, access device 130 takes the form of a personal computer, workstation, personal digital assistant, mobile telephone, or any other device capable of providing an effective user interface with a server or database. Specifically, access device 130 includes a processor module 131 one or more processors (or processing circuits) 131, a memory 132, a display 133, a keyboard 134, and a graphical pointer or selector 135.

Processor module 131 includes one or more processors, processing circuits, or controllers. In the exemplary embodiment, processor module 131 takes any convenient or desirable form. Coupled to processor module 131 is memory 132.

Memory 132 stores code (machine-readable or executable instructions) for an operating system 136, a browser 137, and a graphical user interface (GUI) 138. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of GUI 138 on display 133. Upon rendering, GUI 138 presents data in association with one or more interactive control features (or user-interface elements). (The exemplary embodiment defines one or more portions of interface 138 using applets or other programmatic objects or structures from server 120.)

More specifically, graphical user interface 138 defines or provides one or more display regions, such as a query or search region 1381 and a search-results region 1382. Query region 1381 is defined in memory and upon rendering includes one or more interactive control features (elements or widgets), such as a query input region 1381A, a query submission button 1381B. Search-results region 1382 is also defined in memory and upon rendering presents a variety of types of information in response to a query submitted in region 1381. In the exemplary embodiment, the results region identifies one or more source case law documents (that is, one ore good cases, usually no more than five), jurisdictional information, issues information, additional key cases, key statutes, key briefs or trial documents, key analytical materials, and/or additional related materials. (See FIG. 3, which is described below, for a more specific example of a results region.) Each identified document in region 1382 is associated with one or more interactive control features, such as hyperlinks, not shown here. User selection of one or more of these control features results in retrieval and display of at least a portion of the corresponding document within a region of interface 138 (not shown in this figure.) Although FIG. 1 shows query region 1381 and results region 1382 as being simultaneously displayed, some embodiments present them at separate times.

Exemplary Method of Screening or Processing Queries

Figure 2:
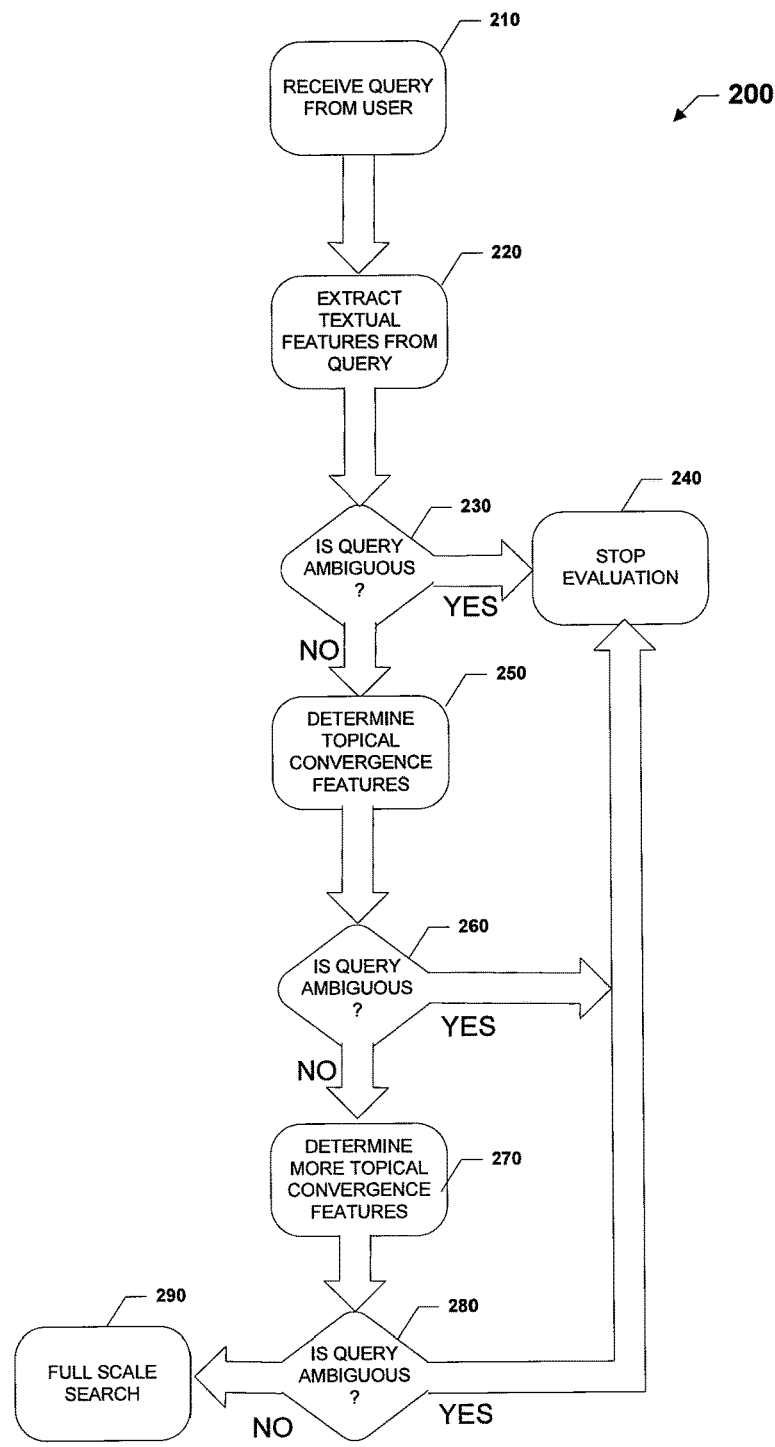
FIG. 2 is a flowchart of an exemplary method of processing queries which corresponds to one or more embodiments of the present invention.

FIG. 2 shows a flowchart 200 of an exemplary method of evaluating the quality of a user query. The flowchart includes process blocks 210-XXX.

In block 210, the exemplary method begins with receipt of a user query. In the exemplary embodiment, receiving a user query entails a user logging into an online legal research system, such as the Westlaw system, using a client access device, and entering and submitting a query through a graphical user interface into the system. Submission of the query results in communication of the query over a wide- or local-area network to a server within the system, with the server including a processor and memory storing machine executable instructions for processing a query as described herein. Execution continues at block 220.

Block 220 entails extracting textual features from the query. In the exemplary embodiment, this extraction entails removing stop words, punctuation marks, and other symbols from the query. It also entails removing person names, with this removal based on a name list. Exemplary stop words include common words, such as "the," "a," "and," "who," "for" and "is." The person names query removes person names from the query. (The exemplary embodiment, which is based on a legal domain, assumes that if a query only contains person names, the user is most likely trying to retrieve a specific case; therefore the query is not a good query.) Exceptions exist; for example, the query "Heck Balisok" is considered good since it involves two different case names and the user is looking for the issues in these cases, not the cases themselves.

After stripping the unwanted text, the exemplary embodiment groups the remaining terms into a set of one or more word pairs. The table below shows two sample queries and the extracted word pairs. (Note that some embodiments may not employ stemming as indicated in the table.)

| Sample Query | Extracted Word Pairs |
| --- | --- |
| Who is a public figure for speech defamation? | 1) public-public, 2) public-figure, 3) public-4) speech, 5) public-defamati, 6) figure-figure, 7) speech-figure, 8) defamati-figure, 9) speech-speech, 10) speech-defamati, 11) defamati-defamati. |
| Berderka misrepresentations unreported decisions | 1) decision-decision; 2) unreport-unreport; 3) misrepre-misrepre; 4) decision-misrepre, 5) decision-unreport |

After the word pairs are defined the exemplary embodiment determines the following set of query features:
1. Number of Word pairs. If a query contains text with legal concepts, it is likely to be a good query.
2. tfidf score for each word pair. a tfidf score is determined for each word pair based on a dictionary of word pairs that are extracted from a corpus of legal headnotes. (Headnotes are understood to be brief statements regarding the legal holdings and principles from judicial opinions.) The word pairs are defined as words within a certain distance, for example five words, of each other within the query.
3. Sum of tfidf Scores values for the set of Word pairs. The sum of tfidf values of all the Word pairs. (tfidf is the product of the term frequency (tf) and the inverse document frequency (idf) of the term.)
4. Max value of tfidf Score for Word pairs. The maximal tfidf value of all the Word pairs.
5. Mean tfidf Score for Word pairs. The mean tfidf score is computed as the sum of valid word pairs' tfidf score normalized or divided by the number of valid word pairs.
6. Deviation tfidf Score for Word pairs. The deviation of the tfidf values of all the Word pairs.

Execution then proceeds to block 230.

Block 230 entails determine whether the query is bad, in other words ambiguous. In the exemplary embodiment, this entails applying the following set of rules to one or more of the extracted features:
  a. if (is single word query) and (number of word pairs) <=2, then designate query as bad;
  b. if (number of word pairs)<=5, and if 9<(sum of TFIDF)<=14, and if (max value of TFIDF>4.6), then designate query as bad;
  c. if neither of conditions a or b is true, continue evaluation of query.

If the query is determined as bad, that is ambiguous, execution branches to block 240 which terminates the query processing in the exemplary embodiment. However, some embodiments alert the user that the query has been deemed ambiguous and request further information or query revision from the user. If further information, such as revised query is submitted, execution returns to block 220 for extraction of features from the revised query. On the other hand, if the determination is not bad, further evaluation of the query continues at block 250. (Some embodiments may skip this further evaluation and proceed to full scale searching based on the query.)

Block 250 entails extracting or determining topical divergence features regarding the query. In the exemplary embodiment, this entails determining a number of legal topical or subject matter categories from a topical hierarchy that are related to the query as well as a number of secondary law documents related to the query. To this end, the exemplary embodiment conducts two separate searches based on the query: a search of a headnote database for the top 25, 50, 75, or 100 headnotes and their associated KeyNumber™ topical codes, and a search of a secondary legal materials database to determine the number of relevant secondary documents. The KeyNumber topic codes are then clustered, with the number of resulting clusters defined as the headnote topic number for use below. The secondary legal materials search is conducted using the Westlaw™ ResultsPlus™ document suggestion engine, which is described in copending U.S. patent application Ser. No. 11/028,476 which was filed on Jan. 3, 2005 and which is incorporated herein by reference. The suggestion engine searches for documents from the following secondary materials: American Law Reports (ALR), American Jurisprudence (AMJ), TRE, and LWR and the number of returned documents is designated as "number of RP suggestions." The headnote topic number and number of RP suggestions are used in block 260.

Block 260 entails determining or classifying whether the query is bad (ambiguous) based on the topical divergence features. In making this determination, the exemplary embodiment uses the following rules:
  a. if (deviation of TFIDF)<=0.63 and (Headnote topic number)<=0, then designate the query as bad;
  b. if (deviation of TFIDF<=0.63) and (Headnote topic number)>15, then designate the query as bad;

c. if (deviation of TFIDF<=0.63) and (headnote topic number)>8 and (Headnote topic number)<=15 and (number of word pairs)<=3 and (number of RP suggestions)>11, then designate the query as bad;

d. if (deviation of TFIDF)>0.63 and (number of word pairs)<=5 and (Headnote topic number)>6 and (number of word pairs)<=2 and (number of PR suggestions)>14, then designate the query as bad;

e. if (deviation of TFIDF)>0.63 and (number of word pairs)<=5 and (Headnote topic numbers>6 and (number of word pairs)>2 and (mean of TFIDF)>3.37 and (maximal value of TFIDF)<=5.86), then designate the query as bad;

f. if neither of conditions a, b, c, d, or e is true, continue evaluation of query.

If the query is determined as bad, that is ambiguous, execution branches to block 240 which terminates the query processing in the exemplary embodiment. However, some embodiments alert the user that the query has been deemed ambiguous and request further information or query revision from the user. If further information, such as revised query is submitted, execution returns to block 220 for extraction of features from the revised query. On the other hand, if all the above conditions are false, meaning the query was not designated as bad, further evaluation of the query continues at block 270. (Some embodiments may skip this further evaluation and proceed to full scale searching based on the query.)

Block 270 entails extracting additional process or topical divergence features related to the query. In the exemplary embodiment, this extraction of process features is a two-part process. The first part entails use of a KeyNumber topic finder, and a case-finder. The KeyNumber topic finder takes the query text as input and outputs a number of West Key Numbers topic codes (for example ten to twenty five of them) according to the relevance to the search text as was done at block 240. The exemplary embodiment then clusters these top ranked KeyNumbers, for example, the top 15, to determine a number of relevant KeyNumber topics.

To find or identify relevant caselaw, the exemplary embodiment takes the user's query and 15 top ranked Key Numbers topical codes as inputs and retrieves a set of one or more caselaw documents based on their relevance. It then measures the topical convergence of these caselaw documents. With caselaw documents, however, measuring topical convergence by clustering them into digest topics is less useful as an indicator than it was with headnotes (as done at block 240) since one caselaw document may discuss various legal topics. So rather than rely on digest topics to determine a measure of topical convergence, the exemplary embodiment uses citation information.

Specifically, the exemplary embodiment uses Westlaw™ KeyCite™ citation table to determine the minimum number of publications that need to be collected to cite all top N ranked cases (for example N=10 or N=15) cases that were retrieved based on KeyNumber topic. This minimum number of publications necessary to "span" the list of cases by virtue of a co-citations is indicative of the topical convergence of the retrieved documents and thus the relative ambiguity of the query. In other words, the top 10 cases are searched against the citation table to see how many of them are co-cited in the same publication (either a secondary law document or a case). The idea is that if two cases are co-cited in the same publication, they probably deal with the same or similar legal issues. The minimal number of publications which cover all the top 10 cases is designated as feature QD. Execution continues at block 280.

Block 280 entails determining or classifying whether the query is bad (ambiguous) based on the topical divergence features. In making this determination, the exemplary embodiment uses the following rules:

a. if (number of word pairs)<=2 and (Key number Finder (KNF) topic)>12, then designate query as bad;

b. if (deviation of TFIDF)>0.63 and (number of word pairs)<=5 and (Headnote search topics)>6 and (number of RP suggestions)>6 and (KNF topic)>11, then designate query as bad;

c. if (number of word pairs)<=2 and (KNF topic)>9 and (Headnote search topic>15, then designate query as bad;

d. if (number of word pairs)<=5 and (Headnote search topic)>12 and (KNF topic)>9 and (top document cites number of top 10 cases)<=3 and (Top 10 cases cited by number of documents)>6 and (Top 5 documents cite number of top 10 cases in percentage)<=0.4, then designate query as bad;

e. if (number of word pairs)>2 and (number of word pairs)<=5 and (Headnote search topics)>7 and (KNF topic>11) and (Top 5 documents cite number of top 10 cases in percentage)<=0.4 and (Top 10 cases cited by number of documents)>7), then designate query as bad;

f. if (deviation of TFIDF)<=0.63 and (KNF topic)>9) and ((top document cites number of top 10 cases)<=4, then designate query as bad;

g. if neither of conditions a, b, c, d, e, or f is true, continue evaluation of query.

If the query is determined as bad, that is ambiguous, execution branches to block 240 which terminates the query processing in the exemplary embodiment. However, some embodiments alert the user that the query has been deemed ambiguous and request further information or query revision from the user. If further information, such as revised query is submitted, execution returns to block 220 for extraction of features from the revised query or advanced directly to full scale searching at block 290. On the other hand, if all the above conditions are false, meaning the query was not designated as bad, further evaluation of the query continues at block 290.

Other Embodiments

Some embodiments may use the features noted above in more complex form of good-bad ambiguity classifiers rather than the heuristic ones of the exemplary embodiment. For example, machine learning algorithms, decision rules, decision trees, neural networks, statistical classifiers, binary classifiers (support vector machines, for example), other learning algorithms, or the like may be used to classify queries as ambiguous or not. For example, a set of decision rules may be trained using training examples with known clarity qualities to classify & a query. The input of the decision rules is the set of features. The decision rules are then trained to classify queries into bad or not bad.

Additional embodiments of the present invention include presenting the user with options if the query is determined as bad. One embodiment tells the user that the query was insufficient to run a complete search report. Another embodiment detects an ambiguous query and responds by prompting the user to be more specific about the query terms. Yet another embodiment could present the user with a partial search report in hopes that this will aid the user in clarifying the query.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. A method of evaluating ambiguity of a user query prior to executing the query on a database, saving memory and processing time on a database system, the method comprising:
receiving a user query for searching for responsive documents stored in a first database of documents;
prior to searching the first database, determining a set of features based on the user query including a first step of extracting textual information from the query, the set of features including at least one from the set consisting of removing stop words, removing personal names, removing punctuation marks, and removing non-alphabetical symbols, and a second step of extracting a set of word pairs from the query, wherein determining the set of features further includes:
determining a number of topics in a taxonomy that are relevant to the query;
determining a plurality of topical divergence features based on the determined number of topics that are relevant to the query, the plurality of topical divergence features comprising derived numerical values based on legal categories from both a topical hierarchy and from a set of secondary case law documents related to the query;
determining a set of term frequency inverse document frequency ("tfidf") scores for each word pair, the tfidf scores comprising the product of the term frequency and the inverse document frequency for each word pair; and
determining a set of derivative values based on the tfidf scores;
determining whether the query is ambiguous or not based on the set of features and the plurality of topical divergence features without searching the first database, wherein the determination of ambiguity is based in part on comparing each numerical value derived from a topical divergence feature in the plurality of topical divergence features to a predetermined numerical value range; and
1) upon determining that the user query is ambiguous, generating a signal pertaining to the determined ambiguity; or
2) upon determining that the query is not ambiguous, automatically performing a search of the first database for responsive documents.

2. The method of claim 1, wherein determining whether the query is ambiguous includes determining a value based on frequency of one or more of the word pairs within a collection of documents.

3. The method of claim 1, wherein determining the set of features includes determining a set of caselaw documents based on the query and determining a minimum number of publications required to define a set of publications wherein at least two of the caselaw documents are cited in each of the publications.

4. The method of claim 1, further comprising outputting, in response to a determination that the query is ambiguous, a message to a client access device, requesting that a user submit further information regarding the query.

5. The method of claim 1, further comprising searching the first database based on the query, in response to a determination that the query is not ambiguous.

6. The method of claim 1, wherein the set of derivative values based on the tfidf scores comprise one or more of a sum of tfidf score values, a max value of the tfidf scores, a mean value of the tfidf scores, and a deviation value of the tfidf scores.

7. The method of claim 1, further comprising:
determining a plurality of derivative topical divergence feature values; and
wherein the determining whether the query is ambiguous or not without searching the first database is based on comparing the tfidf scores to a first constant value, comparing the plurality of topical divergence features to a second constant value, comparing the derivative values based on the tfidf scores to a third constant value, and comparing the plurality of derivative topical divergence features to a third constant value.

8. An information retrieval system for evaluating ambiguity of a user query prior to executing the query on a database, saving memory and processing time on a database system comprising:
a server having a processor and a memory, further comprising:
a first database of documents;
means for receiving by the processor a user query for searching for responsive documents stored in the first database;
means for determining by the processor prior to searching the first database a set of features based on the user query including a first step of extracting textual information from the query, the set of features including at least one from the set consisting of removing stop words, removing personal names, removing punctuation marks, and removing non-alphabetical symbols, and a second step of extracting a set of word pairs from the query, wherein the means for determining the set of features further includes:
means for determining a number of topics in a taxonomy that are relevant to the query:
means for determining a plurality of topical divergence features based on the determined number of topics in the taxonomy that are relevant to the query, the plurality of topical divergence features comprising derived numerical values based on legal matter categories from both a topical hierarchy and from a set of secondary case law documents related to the query:
means for determining a set of term frequency inverse document frequency ("tfidf") scores for each word pair, the tfidf scores comprising the product of the term frequency and the inverse document frequency for each word pair; and
means for determining a set of derivative values based on the tfidf scores;
means for determining by the processor whether the query is ambiguous or not based on the set of features and the plurality of topical divergence features without searching the first database, wherein the determination of ambiguity by the processor is based in part on comparing each numerical value derived from a topical divergence feature in the plurality of topical divergence features to a predetermined numerical value range;

means for generating a signal pertaining to query ambiguity upon determining that the user query is ambiguous; and means for automatically performing a search of the first database for responsive documents upon determining that the query is not ambiguous.

9. The system of claim 8, wherein the means for determining whether the query is ambiguous includes means for determining a value based on frequency of one or more of the word pairs within a collection of documents outside the first database.

10. The system of claim 8, wherein means for determining the set of features includes means for determining a set of caselaw documents based on the query and means for determining a minimum number of publications required to define a set of publications wherein at least two of the caselaw documents are cited in each of the publications.

11. The system of claim 8, further comprising means for outputting, in response to a determination that the query is ambiguous, a message to a client access device, requesting that a user submit further information regarding the query.

12. The system of claim 8, further comprising means for searching the first database based on the query, in response to a determination that the query is not ambiguous.

13. The system of claim 8, wherein the set of derivative values based on the tfidf scores comprise one or more of a sum of tfidf score values, a max value of the tfidf scores, a mean value of the tfidf scores, and a deviation value of the tfidf scores.

14. The system of claim 8, further comprising:
means for determining a plurality of derivative topical divergence feature values; and
wherein the means for determining whether the query is ambiguous or not without searching the first database is based on comparing the tfidf scores to a first constant value, comparing the plurality of topical divergence features to a second constant value, comparing the derivative values based on the tfidf scores to a third constant value, and comparing the plurality of derivative topical divergence features to a third constant value.

15. A machine-readable medium that stores instructions to be executed by a machine for evaluating ambiguity of a user query prior to executing the query on a database, saving memory and processing time on a database system, the instructions when executed causing the machine to:
receive a user query for searching for responsive documents stored in a first database of documents;
prior to searching the first database, determine a set of features based on the user query including a first step of extracting textual information from the query, the set of features including at least one from the set consisting of removing stop words, removing personal names, removing punctuation marks, and removing non-alphabetical symbols, and a second step of extracting a set of word pairs from the query, wherein the determining the set of features further includes:
determining a number of topics in a taxonomy that are relevant to the query;
determining a plurality of topical divergence features based on the determined number of topics in the taxonomy that are relevant to the query, the plurality of topical divergence features comprising derived numerical values based on legal categories from both a topical hierarchy and from a set of secondary case law documents related to the query;
determining a set of term frequency inverse document frequency ("tfidf") scores for each word pair, the tfidf scores comprising the product of the term frequency and the inverse document frequency for each word pair; and
determining a set of derivative values based on the tfidf scores;
determine whether the query is ambiguous or not based on the set of features and the plurality of topical divergence features without searching the first database, wherein the determination of ambiguity is based in part on comparing each numerical value derived from a topical divergence feature in the plurality of topical divergence features to a predetermined numerical value range; and
1) upon determining that the user query is ambiguous, generate a signal pertaining to the determined ambiguity; or
2) upon determining that the query is not ambiguous, automatically performing a search of the first database for responsive documents.

16. The machine-readable medium of claim 15, wherein the determining whether the query is ambiguous includes determining a value based on frequency of one or more of the word pairs within a collection of documents outside the first database.

17. The machine-readable medium of claim 15, further comprising outputting, in response to a determination that the query is ambiguous, a message to a client access device, requesting that a user submit further information regarding the query.

18. The machine-readable medium of claim 15, wherein determining the set of features includes determining a set of caselaw documents based on the query and determining a minimum number of publications required to define a set of publications wherein at least two of the caselaw documents are cited in each of the publications.

19. The machine-readable medium of claim 15, wherein the set of derivative values based on the tfidf scores comprise one or more of a sum of tfidf score values, a max value of the tfidf scores, a mean value of the tfidf scores, and a deviation value of the tfidf scores.

20. The machine-readable medium of claim 15, further comprising:
determining a plurality of derivative topical divergence feature values; and
wherein the determining whether the query is ambiguous or not without searching the first database is based on comparing the tfidf scores to a first constant value, comparing the plurality of topical divergence features to a second constant value, comparing the derivative values based on the tfidf scores to a third constant value, and comparing the plurality of derivative topical divergence features to a third constant value.

* * * * *